United States Patent
Liu et al.

(10) Patent No.: US 6,872,450 B2
(45) Date of Patent: Mar. 29, 2005

(54) WATER-STABLE PHOTOLUMINESCENT SEMICONDUCTOR NANOCRYSTAL COMPLEXES AND METHOD OF MAKING SAME

(75) Inventors: Wei Liu, Guilderland, NY (US);
Zuoyan Peng, Guilderland, NY (US);
Michael LoCascio, Albany, NY (US)

(73) Assignee: Evident Technologies, Troy, NY (US)

( * ) Notice: Subject to any disclaimer, the term of this patent is extended or adjusted under 35 U.S.C. 154(b) by 0 days.

(21) Appl. No.: 10/616,975

(22) Filed: Jul. 11, 2003

(65) Prior Publication Data

US 2004/0115817 A1 Jun. 17, 2004

Related U.S. Application Data

(60) Provisional application No. 60/420,534, filed on Oct. 23, 2002.

(51) Int. Cl.[7] .................................................. B32B 5/16
(52) U.S. Cl. ................ 428/403; 428/407; 252/301.4 R; 252/301.4 S; 252/301.6 R; 252/301.6 S
(58) Field of Search ................................ 428/403, 407; 252/301.4 R, 301.4 S, 301.6 R, 301.6 S

(56) References Cited

U.S. PATENT DOCUMENTS

| | | | | |
|---|---|---|---|---|
| 6,251,303 B1 | * | 6/2001 | Bawendi et al. | ...... 252/301.4 R |
| 6,319,426 B1 | * | 11/2001 | Bawendi et al. | ...... 252/301.4 R |
| 6,426,513 B1 | * | 7/2002 | Bawendi et al. | ............... 257/13 |
| 6,444,143 B2 | * | 9/2002 | Bawendi et al. | ...... 252/301.6 S |
| 6,602,671 B1 | * | 8/2003 | Bawendi et al. | ............. 435/7.1 |
| 6,617,583 B1 | * | 9/2003 | Bawendi et al. | ....... 250/370.01 |
| 6,774,361 B2 | * | 8/2004 | Bawendi et al. | ............ 250/307 |

* cited by examiner

*Primary Examiner*—Leszek Kiliman
(74) *Attorney, Agent, or Firm*—Kenyon & Kenyon

(57) ABSTRACT

A method for preparing water-stable semiconductor nanocrystal complexes that can be stably coupled to tertiary molecules using a self-assembled coating of diblock polymers. The diblock polymers have hydrophilic ends containing hydrophilic functional groups and hydrophobic ends containing hydrophobic functional groups. The diblock polymers are assembled around a semiconductor nanocrystal having a lyophilic surface outer layer. The diblock polymers are further crosslinked via bridging molecules that link adjacent diblock polymers through the hydrophilic functional groups of the hydrophilic ends of the diblock polymers to form a semiconductor nanocrystal complex. The functional groups present on the outer surface of the amphiphilic diblock polymer may serve as attachment sites for coupling tertiary molecules to the semiconductor nanocrystal complex.

18 Claims, 5 Drawing Sheets

Amino-QD w/ Streptavidin + Biotin Terminated Bead

WATER-STABLE PHOTOLUMINESCENT SEMICONDUCTOR NANOCRYSTAL COMPLEXES AND METHOD OF MAKING SAME

CROSS-REFERENCE TO RELATED U.S. APPLICATIONS

The present application claims the benefit of U.S. Provisional Application No. 60/420,534 filed on Oct. 23, 2002.

FIELD OF THE INVENTION

The present invention relates generally to surface-modified semiconductor nanocrystal complexes that are water-stable and to methods of manufacturing the same.

BACKGROUND OF THE INVENTION

Biotechnology research, including biological, biomedical, genetic, fermentation, aquaculture, agriculture, forensic and environmental research, demands the ability to identify biological molecules both inside and outside cells. Typically, fluorescing dyes are used to assist in the detection of such biological molecules and in general involve coupling a fluorophore to a probe molecule, having a specific affinity towards a target biological molecule. The resultant fluorescent tagged probe molecule is used in a biological assay to optically identify the presence of the target biological molecule. Such fluorescing dyes, however, are often of marginal use because of low signal to noise ratios, low photostability, and lack of sensitivity. In particular, many fluorescing dyes have broad emission spectra and narrow absorption spectra thereby limiting the number of tests that can be performed in a single assay. Specifically, it is difficult to discriminate the fluorescence associated with a particular dye given the high background and the broad emission spectra of the various dyes in a single test.

Recently, quantum dots (also known as semiconductor nanocrystals) have been used as replacements for the traditional molecular fluorescing dyes because they exhibit unique optical properties. In particular, quantum dots have a continuously selectable wavelength emission, have narrow spectral emissions, and broadband absorption. As a result, they are particularly suitable as dye replacements for a variety of applications including fluorescence-based biological assays.

Such biological assay are typically undertaken in aqueous solutions and it is therefore desirable that the quantum dots be water soluble and be capable of stably coupling to a probe molecule. Attempts at making quantum dots water-soluble have involved coating the quantum dots with a hydrophilic coating. Such attempts, however, have resulted in precipitation of the quantum dots, indicating a lack of tight binding of the hydrophilic coating to the nanocrystal surface. In biological assays that require the quantum dot to couple to a probe molecule, a lack of tight coupling between the probe molecule and the nanocrystal surface will lead to the probe molecule becoming disassociated resulting in inaccurate results of the assay. Attempts at making quantum dots water-soluble and able to stably couple to a probe molecule have also resulted in a marked decrease in the fluorescence quantum yield over time due to oxidation of the nanocrystal. One particular attempt in making quantum dots water soluble involves the use of micelles to solubilize quantum dots and is described in U.S. Pat. No. 6,319,426 to Bawendi. The micelles that are formed using the reagents described Bawendi, however, are not stable in aqueous solutions. Therefore, recent work has failed to produce a suitable coating that provides for both water solubility and stable coupling to probe molecules because the coatings themselves are not strongly coupled to the nanocrystal surface and tend to detach along with any probe molecule that have been attached to them.

SUMMARY OF THE INVENTION

In general, the present invention provides a water-stable nanocrystal complex capable of emitting light at a predetermined wavelength upon excitation by light having a wavelength equal to or shorter than the emission wavelength. The present invention also provides a water-stable nanocrystal complex capable of covalently coupling to one or more tertiary molecules in such a manner that the nanocrystals do not disassociate with the tertiary molecule over time. The present invention further provides a water-stable nanocrystal complex that reduces the ability of oxygen to reach the nanocrystal surface and therefore greatly reduces or prevents quantum yield reduction due to oxidation.

In particular, the present invention provides a semiconductor nanocrystal complex comprising a surface-coated semiconductor nanocrystal surrounded by a diblock polymer coating. The diblock polymer coating comprises a plurality of diblock polymers with each diblock polymer having a hydrophobic end for interacting with the surface-coated semiconductor nanocrystal and a hydrophilic end for interacting with an aqueous medium. Adjacent ones of the plurality of diblock polymers are linked together by a bridging molecule so that the diblock polymers are linked together to form a cohesive coating around the semiconductor nanocrystal that will not dissociate in water over long periods of time and that will provide a strong and stable anchorage for tertiary molecules that may be attached to the hydrophilic ends of the diblock polymers.

The present invention also provides a method of manufacturing a semiconductor nanocrystal complex having an amine-terminated functional group. The method comprises providing a semiconductor nanocrystal, exposing the semiconductor nanocrystal to a solution of diblock polymers, wherein each diblock polymer has a hydrophobic end and a hydrophilic end. The hydrophilic end of each diblock polymer terminates in a carboxy functional group. The method further includes exposing the semiconductor nanocrystal to multidentate molecules that have more than one amine functional groups. Such exposure results in the carboxy functional groups of the diblock polymers reacting with one of the more than one amine functional groups of the multidentate molecules to form a peptide bond and the remaining more than one amine functional groups terminating the hydrophilic end of the diblock polymer resulting in a semiconductor nanocrystal complex having an amine-terminated functional group.

DETAILED DESCRIPTION OF THE INVENTION

In general, the present invention relates to a water-stable semiconductor nanocrystal complex comprising a surface-coated semiconductor nanocrystal surrounded by a self-assembled coating of cross-linked amphiphilic diblock polymers (referred to herein as "diblock polymers").

Figure 1:
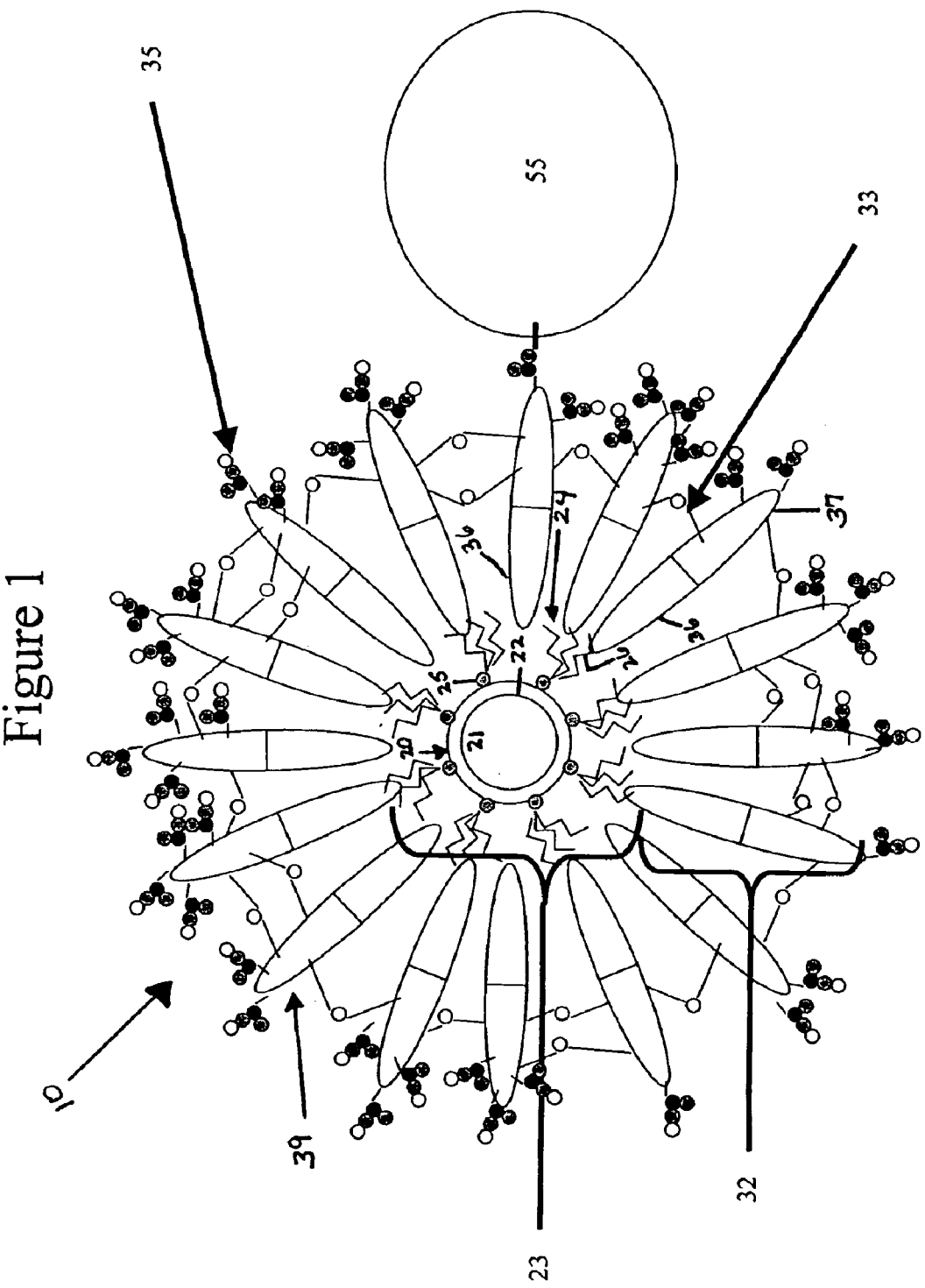
FIG. 1 is a schematic illustration of an embodiment of a semiconductor nanocrystal complex according to the present invention.

In particular, referring to FIG. 1, a semiconductor nanocrystal complex 10 of the present invention comprises a semiconductor nanocrystal 20 (also known as a "semiconductor nanoparticle" or a "quantum dot") that is coated with a layer of surface molecules 24, which have an affinity for the surface of semiconductor nanocrystal 20. As is generally known in the art, semiconductor nanocrystals are spherical nanoscale crystalline materials (although oblate and oblique spheroids can be grown as well as rods and other shapes) having a diameter between 1 nm and 20 nm and typically but not exclusively composed of II-VI, III-V, and IV-VI binary semiconductors. Semiconductor nanocrystal 20 according to the present invention includes a core 21 of a first semiconductor that has a selected composition and diameter that enables light emission at a predetermined wavelength and optionally a shell 22 of a second semiconductor having a bulk bandgap greater than that of the first semiconductor of core 21. Optional shell 22 is preferably between 0.1 nm and 10 nm thick and composed of a semiconductor material that has a lattice constant that matches or nearly matches core 21. Non-limiting examples of semiconductor materials comprising core 21 and shell 22 include ZnS, ZnSe, ZnTe, CdS, CdSe, CdTe, HgS, HgSe, HgTe (II-VI materials), PbS, PbSe, PbTe (IV-VI materials), AlN, AlP, AlAs, AlSb, GaN, GaP, GaAs, GaSb, InN, InP, InAs, InSb (III-V materials).

Surface molecules 24 that coat semiconductor nanocrystal 20 of the present invention are generally organic molecules that have a moiety 25 with an affinity for the surface of semiconductor nanocrystal 20 and a moiety 26 with an affinity for a hydrophobic solvent. Non-limiting examples of moiety 25 include thiols, amines, phosphines, phosphine oxides, and any combinations thereof. Non-limiting examples of surface molecules 24 include trioctyl phosphine oxide (TOPO), trioctyl phosphine (TOP), tributyl phosphine (TBP), dodecyl amine, octadecyl amine, hexadecylamine, stearic acid, oleic acid, palmitic acid, lauric acid, and any combinations thereof. Such surface molecules 24 are typically used in the synthesis of semiconductor nanocrystals and can remain on the surface of the nanocrystals after synthesis or may be added or replaced by other surfaces after synthesis. As is generally known to one of skill in the art, semiconductor nanocrystals 20 according to the present invention may be coated with surface molecules 24 by pyrolysis of organometallic precursors in a chelating ligand solution or by an exchange reaction using the prerequisite salts in a chelating surface solution, such chelating surfaces typically being lyophilic. Surfaces molecules 24 according to the present invention tend to assemble into a coating around semiconductor nanocrystal 20 forming a surface-coated semiconductor nanocrystal 23 and enable it to suspend in a hydrophobic solvent.

Figure 2:
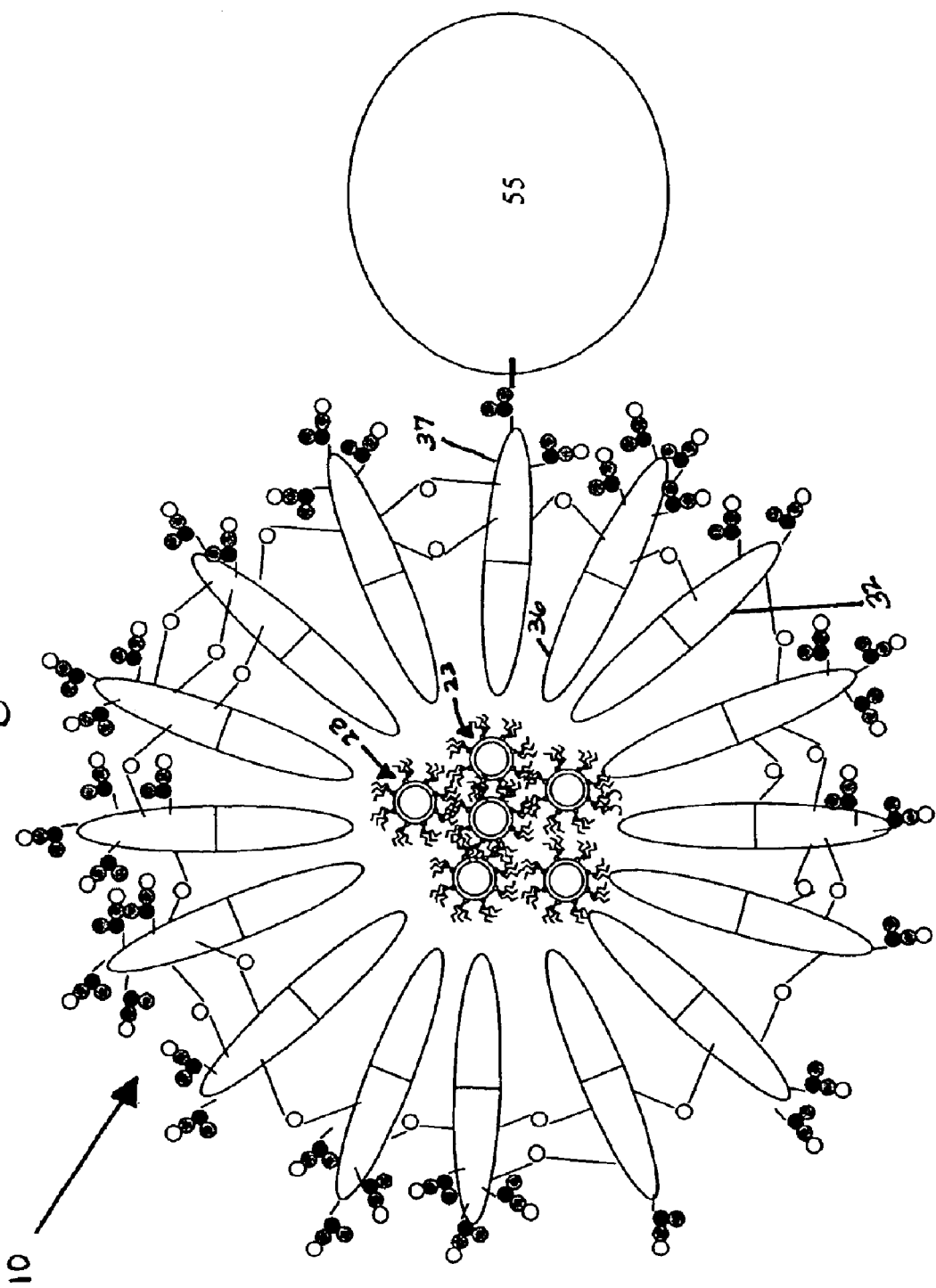
FIG. 2 is a schematic illustration of semiconductor nanocrystal complexes according to the present invention.

In order to render surface-coated semiconductor nanocrystal 23 water-soluble, surface-coated semiconductor nanocrystal 23 of the present invention is surrounded by a coating 39 of diblock polymers 32 to form a micelle. Referring to FIG. 2, more than one surface-coated semiconductor nanocrystal 23 of the present invention may be surrounded by the diblock polymer coating 39. Referring to FIGS. 1 and 2, a diblock polymer 32 is generally but not exclusively a linear chain that has a hydrophobic end 36 comprising hydrophobic functional groups that is covalently bonded to a hydrophilic end 37 comprising hydrophilic functional groups. In an aqueous medium, the diblock polymer coating 39 assembles around surface-coated semiconductor nanocrystal 23 of the present invention. Specifically, hydrophobic end 36 of diblock polymer 32 is attracted to surface-coated nanocrystal 23 and interacts with moiety 26 of surface molecule 24 through noncovalent interactions such as, for example, hydrogen bonding, Van der Waals Forces, and hydrophobic interactions. Hydrophilic end 37 of diblock polymer 32, in turn, is directed to the aqueous medium.

With respect to the lengths of hydrophobic end 36 and hydrophilic end 37 of diblock polymer 32, each end has lengths greater than 1 and preferably each have lengths between 1 and 1000. In a more preferred embodiment, hydrophobic end 36 of diblock polymer 32 has between 60 and 180 carbon atoms. In a more preferred embodiment, hydrophobic end 36 has about 150 carbon atoms and hydrophilic end 37 has about 220–240 carbon atoms. Also in a preferred embodiment, hydrophobic end 36 has about 10–20 monomer units and hydrophilic end 37 has about 110–120 monomer units. Although hydrophilic end 37 and hydrophobic end 36 may have different lengths, in a preferred embodiment they are substantially equal in length.

The hydrophobic functional groups of hydrophobic end 36 are preferably groups of covalently bonded atoms on a larger molecule that are nonpolar and not ionizable and therefore have an affinity for nonpolar and non-ionizable solvents. Non-limiting examples of hydrophobic functional groups according to the present invention include hydrocarbons of various lengths. The hydrophilic functional groups of hydrophilic end 37 are preferably groups of atoms on a larger molecule that are highly polar or ionizable and therefore have an affinity for water and other polar solvents. Non-limiting examples of hydrophilic functional groups include hydroxy, amine, carboxyl, sulfonates, phosphates, amines, nitrates, and any combinations thereof.

The hydrophilic functional groups present on hydrophilic end 37 can serve as an attachment site for covalently coupling to one or more tertiary molecules 55 according to the present invention. For example, as illustrated in FIGS. 1 and 2, hydrophilic end 37 may have terminal hydrophilic functional groups 35, through which tertiary molecules 55 are coupled to semiconductor nanocrystal complex 10. Preferably tertiary molecules 55 are biomolecules that function as probes to detect analytes of interest in a solution. Accordingly, preferably tertiary molecule 55 is a member of a specific binding pair and the analyte desired to be detected is the complementary member of the specific binding pair. Therefore, semiconductor nanocrystal complex 10 having tertiary molecule 55 coupled thereon can be used to detect the presence of the complementary specific binding pair member (the analyte) in a test sample. Tertiary molecule 55 may be either a ligand or receptor and preferably is a member of the following of the following specific binding pairs: antibody/antigen; hapten/antihapten; biotin/avidin (or streptavidin); IgG/protein A or protein G; drug receptor/drug; toxin receptor/toxin; carbohydrate/lectin; peptide receptor/peptide; protein receptor/protein; carbohydrate receptor/carbohydrate; polynucleotide binding protein/polynucleotide; DNA (RNA)/aDNA (aRNA); and enzyme/substrate. Tertiary molecule 55 according to the present invention may also be a polypeptide, a glycopeptide, a peptide nucleic acid, an oligonucleotide, an aptamer, a cellular receptor molecule, an enzyme cofactor, an oligosaccharide, a lipopolysaccharide, a glycolipid, a polymer, a metallic surface, a metallic particle, organic dye molecule, or any combinations thereof.

Non-limiting examples of diblock polymers 32 that comprise the diblock polymer coating 39 surrounding surface-coated semiconductor nanocrystal 23 according to the present invention include poly(acrylic acid-b-methyl methacrylate), poly(methyl methacrylate-b-sodium acrylate), poly(t-butyl methacrylate-b-ethylene oxide), poly (methyl methacrylate-b-sodium methacrylate), poly (methyl methacrylate-b-N-methyl 1-4vinyl pyridinium iodide), poly (methyl methacrylate-b-N,N-dimethyl acrylamide), poly (butadiene-b-methacrylate acid and sodium salt), poly (butadiene(1,2 addition)-b-acrylic acid), poly(butadiene(1,2 addition)-b-sodium acrylate), poly(butadiene(1,4 addition)-b-acrylic acid), poly(butadiene(1,4 addition)-b-sodium acrylate), poly(butadiene(1,4 addition)-b-ethylene oxide), poly(butadiene(1,2 addition)-b-ethylene oxide), poly (styrene-b-acrylic acid), poly(styrene-b-acrylamide), poly (styrene-b-cesium acrylate), poly(styrene-b-sodium acrylate), poly(styrene-b-ethylene oxide), poly(styrene-b-methacrylic acid), poly(styrene-b-sodium methacrylate), and any combinations thereof.

In order to form a cohesive coating around surface-coated semiconductor nanocrystal 23 of the present invention, adjacent diblock polymers 32 of the diblock polymer coating 39 are linked together by bridging molecules 33. Preferably bridging molecules 33 are multidentate bridging molecules having one or more reactive functional groups that can react with and bond to one or more hydrophilic functional groups of hydrophilic end 37 thereby crosslinking adjacent diblock polymers 32 together. Therefore, the self-assembled diblock polymer coating 39 is knit together to form a cohesive coating around surface-coated semiconductor nanocrystal 23 of the present invention that will not dissociate in water over long periods. The multidentate bridging molecule of the present invention may have one or more than one type of reactive functional group. Non-limiting examples of such reactive functional groups include hydroxy (OH), carboxylate (COOH), amine ($NH_2$) groups, and any combinations thereof. In a preferred embodiment, bridging molecule 33 is diamine, 2,2'-(ethylenedioxy) bis (ethylamine) and the amine functional groups on the diamine react with hydrophilic functional groups that are carboxylate groups on hydrophilic end 37 of diblock polymer 32 to form a stable peptide bond.

Although semiconductor nanocrystals complex 10 of the present invention has many applications, because it is water-stable, it is particularly useful for detecting analytes in a solution. In this regard, semiconductor nanocrystal complex 10 having a tertiary molecule 55 coupled thereon may be used in wide variety of assays known to one of skill in the art. In particular, the semiconductor nanocrystal complexes 10 may be used in assays that utilize specific bind pair members to detect the presence of an analyte of interest in a test solution. Such assays and techniques include immunoassays, enzyme-based assays, nucleic acid probe assays, hybridization or immunoblotting techniques, DNA sequencing, flow cytometry, fluorescence imaging, and microscopy. In general, these assays include the analyte of interest binding to the tertiary molecule 55 of semiconductor nanocrystal complex 10 thereby facilitating detection of the presence and possibly the quantity of the analyte, depending on the assay format. The analyte may be any substance desired to be detected in a test solution and includes for example, pharmaceutically active agents, proteins, peptides, polypeptides, polynucleotides, DNA, and RNA. Test samples include biological samples such as whole blood, serum, urine, saliva and tissue samples, soil samples, water samples and food samples. The present invention may also be used in arrays that involve spatial and spectrial multiplexing.

Figure 3:
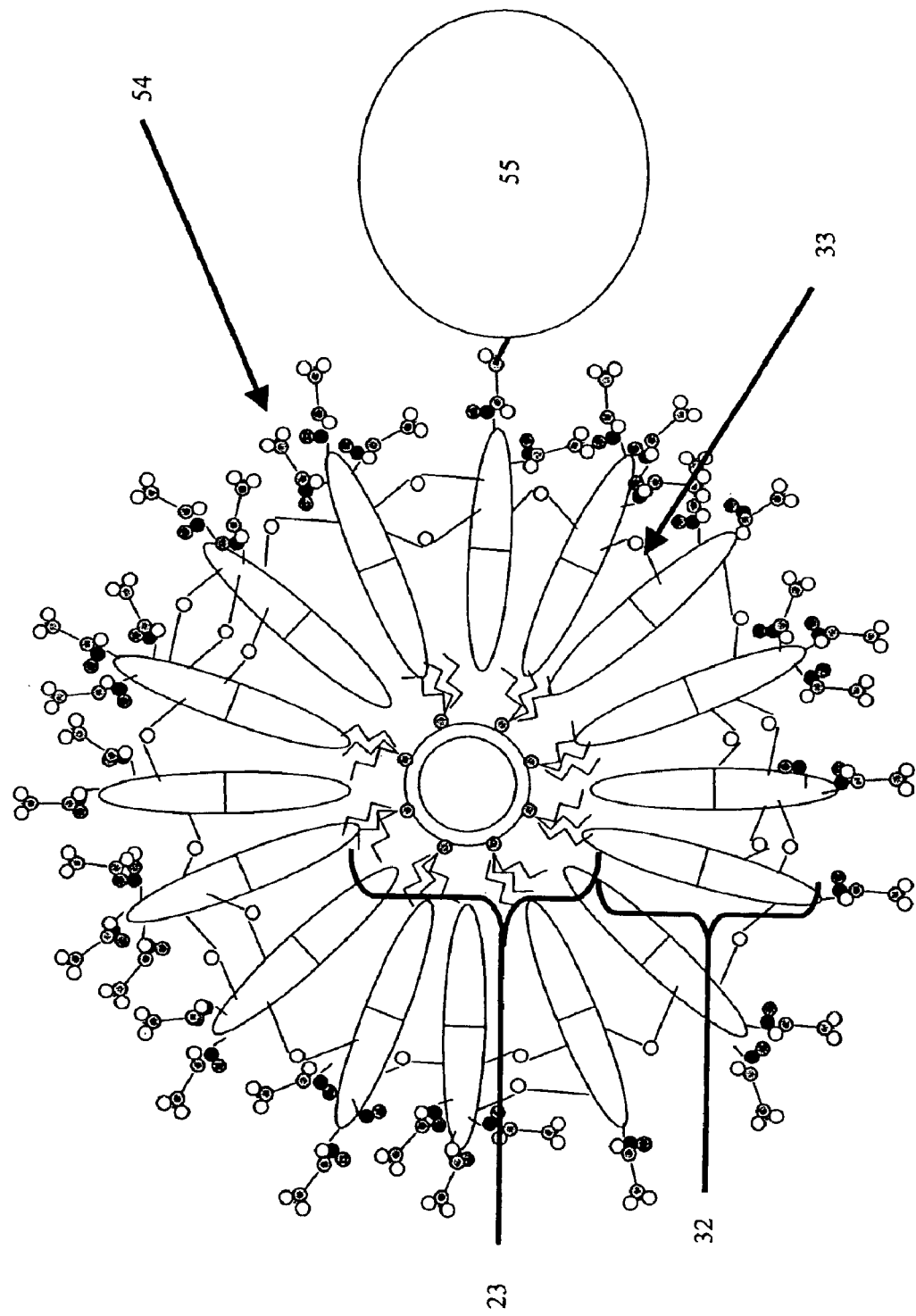
FIG. 3 is a schematic illustration of an alternative embodiment of a semiconductor nanocrystal complex according to the present invention.

The present invention also provides a method of manufacturing a semiconductor nanocrystal complex 10 according to the present invention. The method comprises providing a semiconductor nanocrystal 20 and exposing the semiconductor nanocrystal 20 to a diblock polymer solution to form a semiconductor nanocrystal having a diblock polymer coating assembled therearound (i.e. a semiconductor nanocrystal-loaded micelle), wherein the diblock polymers 32 of the diblock polymer coating have hydrophobic ends 36 and hydrophilic ends 37. Preferably the diblock polymer solution is poly(butadiene (1,4 addition)-b-acrylic acid or poly(styrene-b-acrylic acid) and thereby the hydrophilic ends 37 comprises carboxy functional groups. The method may further comprise exposing the semiconductor nanocrystal-loaded micelle to bridging molecules 33 to crosslink adjacent diblock polymers 33 of the diblock polymer coating 39. Preferably, bridging molecules 33 have more than one amine group such as diamine molecules and the nanocrystals are exposed to a solution of bis 2,2'-(ethylenedioxy) bis (ethylamine). As a result, adjacent diblock polymers may be linked together by crosslinking a subset of the carboxy functional groups via bridging molecules 33 having more than one amine group. Tertiary molecules 55 may be coupled to the remaining carboxyl functional groups via EDC chemistries, such chemistries being with the knowledge of one skilled in the art. In a preferred embodiment, the method further comprises exposing the semiconductor nanocrystal-loaded to a solution of multidentate molecules having more than one amine functional group to react and bond with each of the remaining carboxyl functional groups of the hydrophilic ends 37 of diblock polymers 32 such that all the carboxyl functional groups are "occupied" and semiconductor nanocrystal complex 10 is terminated with free amine functional groups 54, as illustrated in FIG. 3. Tertiary molecules 55 may be coupled to the amine terminal functional groups 54 via conventional EDC chemistries.

Throughout this application, reference has been made to various publications, patents, and patent applications. The teachings and disclosures of these publications, patents, and patent applications in their entireties are hereby incorporated by reference into this application to more fully describe the state of the art to which the present invention pertains.

EXAMPLES

Example 1

The following example discloses a method of assembling diblock polymers 32 having hydrophilic ends 37 comprising carboxy groups around a semiconductor nanocrystal 20 to form a semiconductor nanocrystal having a diblock polymer coating 39 assembled therearound (i.e. a semiconductor nanocrystal-loaded micelle).

Semiconductor nanocrystals in toluene (2 ml) or hexane solution (~5 nmol/ml) were precipitated by the addition of methanol (8 ml) and centrifugation. The nanocrystals were further precipitated by drawing off the supernatant, resuspending the nanocrystals in pure hexane and repeating the precipitation step. The purification process was repeated for three times and the resulted precipitates were reconstituted in chloroform (1 ml).

A diblock polymer solution was prepared by dissolving poly(butadiene (1,4 addition)-b-acrylic acid) or poly (styrene-b-acrylic acid) (50 mg) in a mixture of chloroform (5 ml) and methanol (1:1). The solution was titrated by the organic base, tetramethyl ammonium hydroxide pentahydrate, to neutralize the acrylic acid of the polymer. The diblock polymer solution was added to the nanocrystal solution and the nanocrystal solution was mixed under ultrasonication. Methanol (5 ml) was added to the nanocrystal solution and after the solution was mixed thoroughly, water (1 ml) was added and the solution was mixed again. The organic solvents in the solution were removed by rotary evaporation at room temperature. The resulted solution was diluted by adding distilled water (10 ml), and purified by filtration and centrifugation to remove any free polymers and by products.

Example 2

The present example discloses a method of cross-linking adjacent ones of the diblock polymers 32 to form a semiconductor nanocrystal complex 10.

To further stabilized nanocrystals in aqueous solution, the polymer coating assembled around the nanocrystal surface as described in Example 1 was cross-linked using diamine molecules as linkers. Phosphate buffer (0.5M, 0.4 ml) was added to the nanocrystal-loaded micelle solution (5 ml) obtained in example 1 to adjust pH of the solution to 6.5. EDC (1-thyl-3-(3(-dimethylamionpropyl) carbodiimide hydrochloride) (10 mg) and sulfo-NHS (N-hydroxysulfosuccinimide sodium salts) (20 mg) were added to the solution to activate the carboxylic groups of the polymer assembled around the semiconductor nanocrystal surface. After 30 minutes, a solution (0.1 ml) of Bis (2,2'-(ethylenedioxy)bis(ethylamine))(20 mg/ml) was added gradually into the above solution, and the pH was raised to 8.5 immediately using NaOH solution (1N). The reaction solution was stirred at room temperature (2 hours). The resulted solution was purified by G-25 column to remove the unreacted chemicals and byproducts formed during the reaction.

Figure 4:
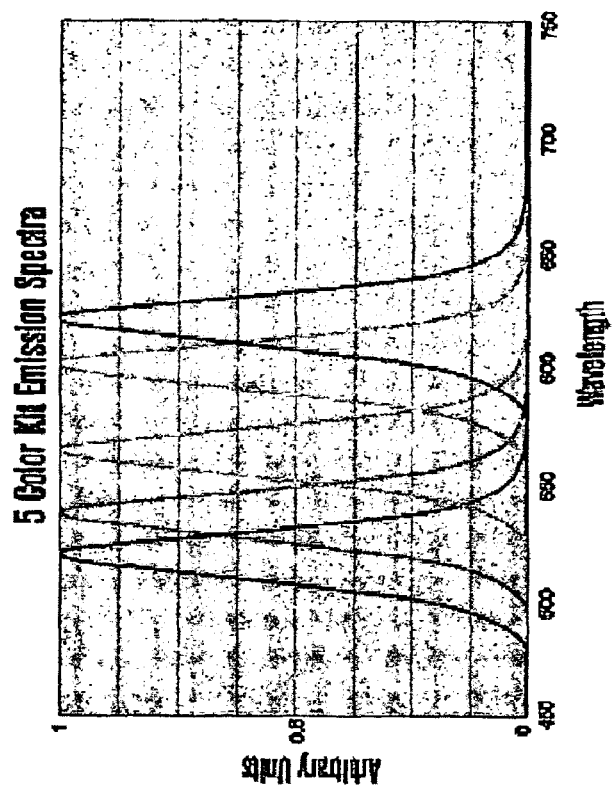
FIG. 4 is a graph showing the absorption spectra and emission spectra of a solution of a monodisperse population of semiconductor nanocrystal complexes according to the present invention.

FIG. 4 is an example absorption and emission (fluorescence) spectra of the resultant monodisperse semiconductor nanocrystal complex. Due to quantum confinement, the electronic energy states are quantized. The successive peaks on the absorption spectra correspond to the energy states of the semiconductor nanocrystal complexes of the present invention. The absorption spectra illustrates that semiconductor nanocrystals complexes of the present invention, unlike conventional organic fluorophores, have a broadband absorption spectra (i.e. they can absorb light with a wavelength shorter than the absorption onset/emission wavelength). The implication of such an absorption spectra is that multiple sizes/colors of semiconductor nanocrystal complexes can be excited with the same light source. Furthermore, the emission wavelength is located at the absorption onset (the first exciton peak) and is independent of the excitation source wavelength. The exhibited emission peak has a narrow full width half maximum (<30 nm) due to small inhomogeneous broadening of a monodisperse population of the nanocrystals in solution.

Figure 5:
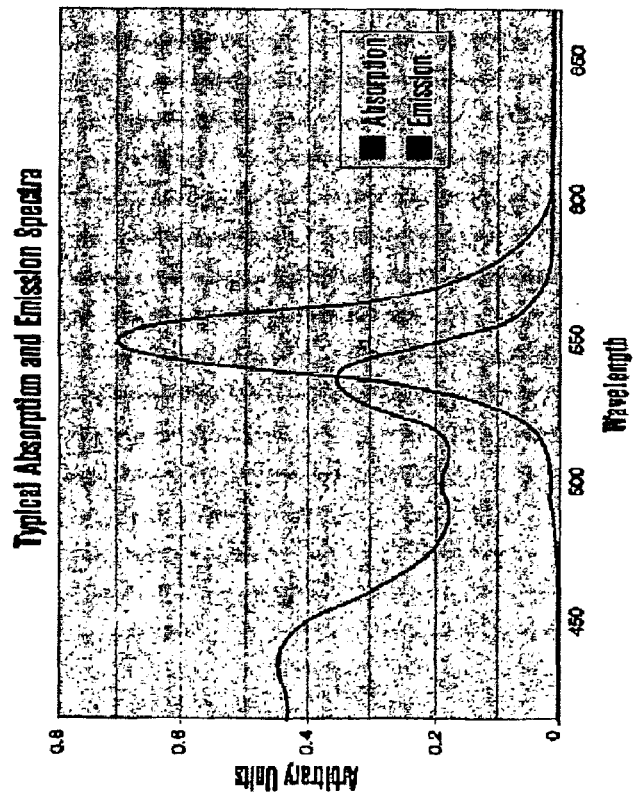
FIG. 5 is a graph showing the emission spectra of five different solutions of mondisperse populations of semiconductor nanocrystal complexes according to the present invention all having different mean diameters.

FIG. 5 shows the emission spectra of five different monodisperse semiconductor nanocrystal complex solutions. The difference between the solutions is the mean diameters of the suspended semiconductor nanocrystals. The larger nanocrystals have redder emissions while the smaller nanocrystals have bluer emission. The nanocrystals shown have a CdSe core and a coating of ZnS. The ZnS has a wider bandgap than the CdSe core and acts to eliminate defects from the CdSe surface thereby enhancing radiative recombination mechanisms and boosting quantum yields.

Example 3

The present example discloses a method of conjugating a tertiary molecule (streptavidin) 55 to the semiconductor nanocrystal complex 10.

Phosphate buffer (0.5M, 0.2 ml, pH 6.5) was added to the nanocrystal-loaded micelle solution (2 ml) from Example 1. To activate the carboxylate group, EDC (10 mg) and sulfo-NHS (20 mg) were added to the solution. The solution was stirred (20 minutes), then streptavidin (4 mg) was added to this solution, and the pH of the solution was raised to 8.5 immediately using NaOH (1N) stock solution. The reaction was allowed to proceed for 2 hours, then purified by G-25 column to remove the unreacted chemicals and byproducts formed during the reaction.

Figure 6:
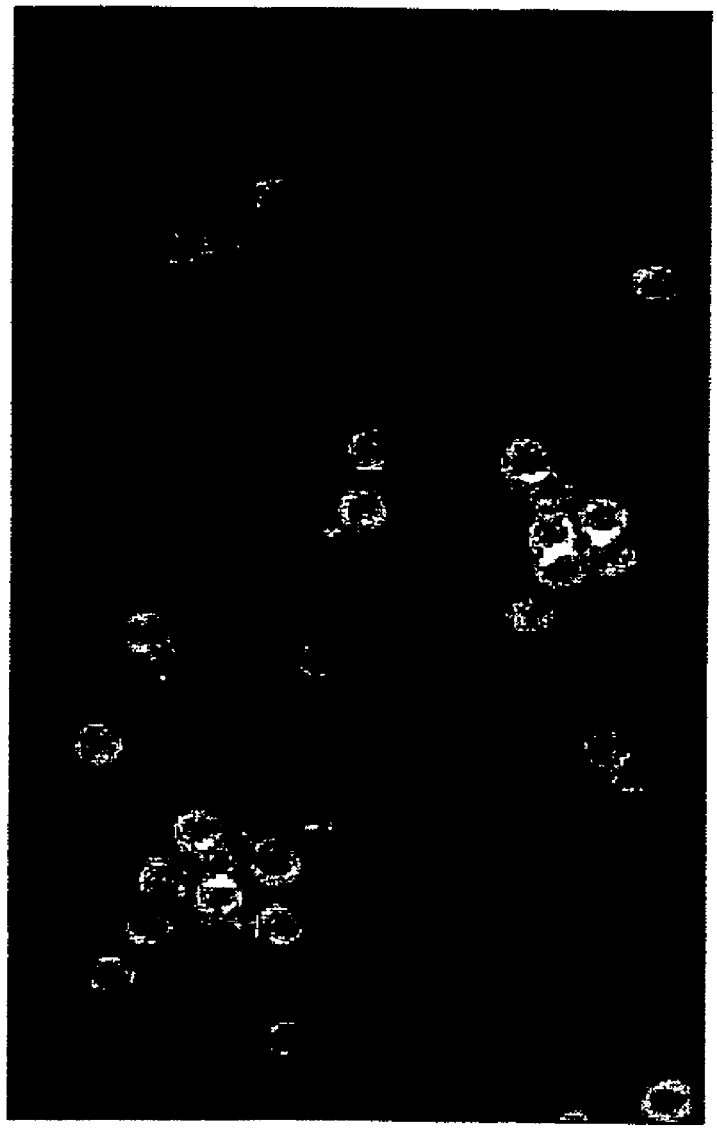
FIG. 6 is an image of biotin functionalized microbeads that have hybridized to semiconductor nanocrystal complexes according to the present invention that have a tertiary molecules attached to the surface thereof.

FIG. 6 illustrates an image of a hybridization assay, captured by a fluorescent microscopy imager operably linked to a CCD camera, where semiconductor nanocrystal complexes are coupled to streptavidin proteins(s). Under ultraviolet illumination, the semiconductor nanocrystal complexes emit light at a characteristic detectable wavelength.

Example 4

The following example discloses a method of synthesizing amine-terminated semiconductor nanocrystal complexes 10 from carboxy-terminated semiconductor nanocrystal complexes 10.

In Example 1, the resultant semiconductor nanocrystal-loaded micelle were terminated by carboxyl functional groups. Phosphate buffer (0.5M, 0.2 ml, pH 6.5) was added to the nanocrystal-loaded micelle solution (2 ml), obtained from Example 1. To this solution, a solution of Bis (2,2'-(ethylenedioxy)bis(ethylamine))(0.3 ml)(100 mg/ml) was added. The reaction was initiated by adding EDC (50 mg) to the solution. The reaction was performed at room temperature under stirring (for 3 hours), then kept overnight at 4° C. The by-products and excess reaction reagents were purified by filtration and centrifugation.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A semiconductor nanocrystal complex comprising:
   a surface-coated semiconductor nanocrystal comprising a semiconductor nanocrystal having a surface comprising molecules having a moiety with an affinity for the semiconductor nanocrystal and a moiety with an affinity for a hydrophobic solvent coating the semiconductor nanocrystal; and a diblock polymer coating surrounding the surface-coated semiconductor nanocrystal, the diblock polymer coating comprising a plurality of diblock polymers, each of the plurality of diblock polymers having a hydrophobic end for noncovalently interacting with the surface-coated semiconductor nanocrystal and a hydrophilic end, wherein adjacent ones of the plurality of diblock polymers are linked together by a bridging molecule.

2. The semiconductor nanocrystal complex of claim 1, wherein the hydrophobic end comprises 80 to 160 carbon atoms.

3. The semiconductor nanocrystal complex of claim 1, wherein the bridging molecule comprises two or more amine groups.

4. The semiconductor nanocrystal complex of claim 1, wherein the bridging molecule comprises a diamine.

5. The semiconductor nanocrystal complex of claim 1, wherein the bridging molecule is bis 2,2'-(ethylenedioxy) bis(ethylamine).

6. The semiconductor nanocrystal complex of claim 1, wherein the surface is selected from the group consisting of trioctyl phosphine oxide, trioctyl phosphine, tributyl phosphine, dodecyl amine, octadecyl amine, hexadecylamine, stearic acid, oleic acid, palmitic acid, and lauric acid.

7. The semiconductor nanocrystal complex of claim 1, wherein the diblock polymer is selected from the group consisting of poly(acrylic acid-b-methyl methacrylate), poly(methyl methacrylate-b-sodium acrylate), poly(t-butyl methacrylate-b-ethylene oxide), poly(methyl methacrylate-b-sodium methacrylate), poly(methyl methacrylate-b-N-methyl 1-4vinyl pyridinium iodide), poly(methyl methacrylate-b-N,N-dimethyl acrylamide), poly(butadiene-b-methacrylate acid and sodium salt), poly(butadiene(1,2 addition)-b-acrylic acid), poly(butadiene(1,2 addition)-b-sodium acrylate), poly(butadiene(1,4 addition)-b-acrylic acid), poly(butadiene(1,4 addition)-b-sodium acrylate), poly(butadiene(1,4 addition)-b-ethylene oxide), poly(butadiene(1,2 addition)-b-ethylene oxide), poly(styrene-b-acrylic acid), poly(styrene-b-acrylamide), poly(styrene-b-cesium acrylate), poly(styrene-b-sodium acrylate), poly(styrene-b-ethylene oxide), poly(styrene-b-methacrylic acid), and poly(styrene-b-sodium methacrylate).

8. The semiconductor nanocrystal complex of claim 7, wherein the diblock polymer is poly(butadiene (1,4 addition)-b-acrylic acid).

9. The semiconductor nanocrystal complex of claim 7, wherein the diblock polymer is poly(styrene-b-acrylic acid).

10. The semiconductor nanocrystal complex of claim 1, wherein the hydrophilic end comprises functional groups for coupling to one or more tertiary molecule.

11. The semiconductor nanocrystal complex of claim 10, wherein the functional groups are amine groups.

12. The semiconductor nanocrystal complex of claim 10, wherein the tertiary molecule is a biomolecule.

13. The semiconductor nanocrystal complex of claim 12, wherein the tertiary molecule is a member of a specific binding pair.

14. The semiconductor nanocrystal complex of claim 13, wherein the member of the specific binding pair is selected from the group consisting of antibody, antigen, hapten, antihapten, biotin, avidin, streptavidin, IgG, protein A, protein G, drug receptor, drug, toxin receptor, toxin, carbohydrate, lectin, peptide receptor, peptide, protein receptor, protein, carbohydrate receptor, carbohydrate, polynucleotide binding protein, polynucleotide, DNA, RNA, aDNA, aRNA, enzyme, substrate.

15. The semiconductor nanocrystal complex of claim 10, wherein the functional groups are selected from the group consisting of hydroxys, amines, carboxyls, sulfonates, phosphates, and nitrates.

16. The semiconductor nanocrystal complex of claim 10, wherein the tertiary molecule is selected from the group consisting of an polypeptide, glycopeptide, peptide nucleic acid, oligonucleotide, aptamer, cellular receptor molecule, enzyme cofactor, oligosaccharide, a liposaccharide, a glycolipid, a polymer, a metallic surface, a metallic particle, and a organic dye molecule.

17. A method of manufacturing a semiconductor nanocrystal complex having an amine-terminated functional group, the method comprising:

providing a semiconductor nanocrystal;

exposing the semiconductor nanocrystal to a diblock polymer, wherein the diblock polymer has a hydrophobic end and a hydrophilic end, the hydrophilic end comprising carboxy terminal functional groups;

exposing the semiconductor nanocrystal to a multidentate molecule having more than one amine functional group;

forming a semiconductor nanocrystal complex having an amine-terminated functional group.

18. The method of claim 13, wherein the multidentate molecule is Bis (2,2'-(ethylenedioxy)bis(ethylamine)).

* * * * *